United States Patent Office 3,368,939
Patented Feb. 13, 1968

3,368,939
METHOD OF PRODUCING TRANQUILIZATION
Maxwell Gordon, Philadelphia, Pa., assignor to Smith Kline & French Laboratories, Philadelphia, Pa., a corporation of Pennsylvania
No Drawing. Filed Oct. 10, 1966, Ser. No. 585,274
4 Claims. (Cl. 167—65)

ABSTRACT OF THE DISCLOSURE

A method of treating subject in need of tranquilizing by oral administration of 2-methyl-2-propyl-1,3-propanediol. Also described are oral dosage units useful in this method.

---

This invention relates to a new medical method for producing transquilizing activity using 2-methyl-2-n-propyl-1,3-propanediol and to pharmaceutical dosage unit forms containing the diol for use in said method.

Meprobamate, 2-methyl-2-propyl-1,3-propanediol dicarbamate, is now recognized as a major tranquilizing agent especially as a drug for inducing an anti-anxiety effect. The drug has been found to develop a mild physical dependence but often with serious withdrawal signs along with other more general side-effects, see Physicians' Desk Reference, 1966, page 1043. The meprobamate U.S. Patent, 2,724,720, states that the dicarbamate has considerably more potency in certain pharmacological procedures than does the diol. Also, meprobamate is known to be effective per se in the animal organism rather than being hydrolyzed to its parent diol in vivo, S. H. Eisenberg and J. S. Neviosev, Ann. N.Y. Acad. Sci., 67, 853 (1957).

I have now unexpectedly found that oral compositions containing 2-methyl-2-propyl-1,3-propanediol are equipotent by weight of active ingredient with meprobamate on the basis of overtreating 150 human patients. I have also further found that fewer general side effects are noticed, especially skin eruptions. Most important, in certain recognized pharmacological procedures I have demonstrated that 2-methyl-2-propyl-1,3-propanediol has no appreciable addictive potential or withdrawal symptoms while meprobamate does indeed exhibit such effects. To my knowledge no tranquilizing activity for 2-methyl-2-propyl-1,3-propanediol have been previously described in the prior art.

Therefore this invention concerns methods of using oral pharmacetutical compositions containing an effective but nontoxic quantity of 2-methyl-2-propyl-1,3-propanediol most often in the form of a tablet, hard or soft gelatin capsule, troche, lozenge, sustained releast suspension, tablet or capsule, etc. The dosage amounts of diol per unit of medication will comprise about 100–750 mg., preferably 200–500 mg. Such oral dosage units are administered from 1–6 times daily within the methods for inducing a transquilizing or anti-anxiety effect described hereafter.

These oral compositions are prepared by standard pharmaceutical methods such as by mixing with the pharmaceutical carrier for filling into a hard or soft gelatin capsule, by wet or dry granulation formation of a tablet, by mixing a micronized power with a liquid carrier, etc.

The pharmaceutical carrier employed may be, for example, either a solid or liquid. Exemplary of solid carriers are lactose, terra alba, sucrose, talc, gelatin, agar, pectin, acacia, magnesium stearate, stearic acid and the like. Exemplry of liquid carriers are syrup, peanut oil, olive oil, water and the like. Similarly the carrier or diluent may include any time delay material known to the art, such as hydrogenated castor oil, glyceryl monostearate, or glyceryl distearate alone or admixed with a wax.

The methods of this invention comprise the oral administration of an effective but nontoxic transquilizing quantity of 2-methyl-2-propyl-1,3-propanediol to a disturbed animal subject or host including humans. The administration is usually in the form of an oral unit dosage, for example a tablet or capsule as described hereabove. The total daily dosage regimen for example will be between about 0.5–2.5 g. preferably from 1–2 g. of the diol chemical.

The pharmacological dependence and withdrawal comparisons alluded to hereabove were as follows:

Meprobamate and 2-methyl-propyl-1,3-propanediol were both administered to parallel groups of 4 and 3 monkeys respectively at 35 mg./kg. (s.c.) every four hours. On the 14th day the dose was raised to 70 mg./kg. Two mg./kg. of nalorphine administered on the 28th day produced no effects in the diol group but produced mild to moderate withdrawal signs in the meprobamate group (piloerection, nausea, muscle spasticity, dyspnea). Abrupt withdrawal on the 35th day produced no effects in the diol group but withdrawal signal similar to those induced with nalorphine in the meprobamate group.

In a second test 6 dogs are rendered barbiturate dependent by administration of 100 mg./kg./day of sodium barbital for six weeks. Abstinance signs at withdrawal were suppressed by mephrobamate at 150 mg./kg. but not by the diol at 300 mg./kg.

Oral composition containing 2-methyl-2-propyl-1,3-propanediol were used in over 150 human patients by six different clinical investigators who had used meprobamate extensively in their practices. A response equivalent quantitatively with that of merprobamate was reported. Generally fewer side effects were reported than with meprobamate. Especially few skin eruptions, which are fairly common with meprobamate, were observed. The acute $LD_{50}$ of the diol in mice orally is about twice that of meprobamate (2121 mg./kg. v. 1280 mg./kg.).

The following examples are designed to illustrate this invention.

Example 1

Two-hundred fifty mg. of 2-methyl-2-propyl-1,3-propanediol and 30 mg. of lactose were mixed, screened and filled into a #2 hard gelatin capsule.

A 250 mg. capsule was given orally three times daily to a mentally disturbed patient. Effects quivalent to that observed with meprobamate (3×200 mg.) were observed with the comment that the patient slept better and was less sedated.

A 250 mg. capsule was given orally twice daily to an alcoholic patient who lost the desire to drink. Meprobamate had had no such therapeutic effect.

Example 2

2-methyl-2-propyl-1,3-propanediol was ground, screened and filled into a #2 hard gelatin capsule in 250 mg. A disturbed patent was administered three capsules a day and was observed to feel stronger. Meprobamate (3×200) gave no observable effect.

Example 3

2-methyl-2-propyl-1,3-propanediol, 500.0 mg., in two hard gelatin capsules was administered to a disturbed patient three times daily with the patient observing a feeling of "more energy." An equivalent dose of meprobamate produced a heavy sedation.

What is claimed is:
1. The method of producing tranquilizing activity in a disturbed animal subject in need of tranquilization comprising the oral administration to said subject of an effective but nontoxic quantity of 2-methyl-2-propyl-1,3-propanediol.

2. The method of claim 1 in which a daily dosage regimen of about 0.5–2.5 g. of 2-methyl-2-propyl-1,3-propanediol is used.

3. The method of claim 1 in which a dosage unit containing from about 100–750 mg. of 2-methyl-2-propyl-1,3-propanediol is administered from 1–6 times daily.

4. The method of claim 1 in which said subject is a human patient.

References Cited

Buttle et al.: Jour. Pharmacy and Pharmacology 10, July 1958 (pp. 447–449).

ALBERT T. MEYERS, *Primary Examiner.*

S. FRIEDMAN, *Assistant Examiner.*